United States Patent [19]

Fisher et al.

[11] Patent Number: 5,290,531
[45] Date of Patent: Mar. 1, 1994

[54] METHOD OF MAKING AMMONIUM BROMIDE AND CALCIUM BROMIDE

[75] Inventors: Russell A. Fisher; Surendra K. Mishra, both of The Woodlands; Rosa T. Swartwout, Houston, all of Tex.

[73] Assignee: Tetra Technologies, Inc., The Woodlands, Tex.

[21] Appl. No.: 853,392

[22] Filed: Mar. 18, 1992

[51] Int. Cl.$^5$ .................. C01C 1/16; C01F 11/34
[52] U.S. Cl. .................. 423/470; 423/471; 423/497
[58] Field of Search .................. 423/497, 470, 471

[56] References Cited

U.S. PATENT DOCUMENTS

| | | |
|---|---|---|
| 193,920 | 8/1877 | Cabot . |
| 733,467 | 7/1903 | Dow . |
| 805,581 | 11/1905 | Pennock . |
| 1,359,097 | 11/1920 | Nishigawa . |
| 1,384,141 | 7/1921 | MacMahon . |
| 1,453,060 | 4/1923 | Bosch et al. . |
| 1,710,636 | 4/1929 | Gluud et al. . |
| 1,816,996 | 8/1931 | Barrett . |
| 1,872,292 | 8/1932 | Hochwalt et al. ........... 423/471 |
| 1,913,372 | 6/1933 | Cole ........... 423/471 |
| 2,622,004 | 12/1952 | Miller et al. . |
| 2,666,686 | 1/1954 | Miller et al. . |
| 2,714,550 | 8/1955 | Miller . |
| 2,843,454 | 7/1958 | Devaux et al. . |
| 3,121,610 | 2/1964 | McLachlan . |
| 3,170,762 | 2/1965 | Ben-Ari et al. . |
| 3,203,894 | 8/1965 | Ikuno . |
| 3,329,479 | 7/1967 | Hustiny ........... 423/497 |
| 3,449,067 | 6/1969 | Schmitt et al. . |
| 3,471,251 | 10/1969 | Szczodry ........... 423/470 |
| 3,829,553 | 8/1974 | Lynn . |

FOREIGN PATENT DOCUMENTS 0285915 9/1928 United Kingdom ........... 423/497

OTHER PUBLICATIONS

Te-Pang Hou, Manufacture of Soda, p. 229, 1942.
The Condensed Chemical Dictionary, revised by Hawley, Van Nostrand Reinhold Company, Inc. (1981), p. 958.

Primary Examiner—Benjamin R. Fuller
Assistant Examiner—Valerie Ann Lund
Attorney, Agent, or Firm—Arnold, White & Durkee

[57] ABSTRACT

A method of converting sodium bromide brine to ammonium bromide brine and optionally to calcium bromide is disclosed. The method involves introducing ammonia and carbon dioxide into the reactant brine, removing a resulting bicarbonate precipitate, driving off any excess ammonium carbonate, and optionally contacting with lime.

23 Claims, 3 Drawing Sheets

METHOD OF MAKING AMMONIUM BROMIDE AND CALCIUM BROMIDE

FIELD OF THE INVENTION

This invention relates to methods for converting sodium bromide to ammonium bromide and optionally to calcium bromide.

BACKGROUND OF THE INVENTION

Bromide compounds are of great commercial importance to several industries. Calcium bromide brines, for example, are used in oil well completion and workover fluids. Typically, while a well is being drilled, drilling mud (a suspension of solids such as barite, bentonite, or clay in water) is used to carry cuttings from the bit to the surface, to maintain sufficient hydrostatic pressure in the borehole to prevent a blowout, and to cool the bit and reduce friction between the drill string and the sides of the borehole. Most of these functions must also be performed during workover and completion operations, but drilling mud is unsatisfactory in those situations for several reasons. First, it contains a major amount of suspended solids, and the solid particles are detrimental to the workover and completion operations. Second, the mud is relatively expensive. Water by itself is not satisfactory either, in part because its specific gravity is not high enough. Calcium bromide does not have the drawbacks of mud, and as a completion fluid has a particular advantage in that solids free aqueous solutions of very high specific gravity can be made from it. Calcium bromide and other high density salt solutions used in this way are commonly known as clear brine fluids.

The present invention utilizes sodium bromide in the manufacture of ammonium bromide and calcium bromide. Sodium bromide brine is a waste product of some commercially used chemical processes, and thus is readily available. However, before the present invention, sodium bromide brine has often been disposed of, a practice which wastes the energy and effort expended to purify and concentrate the bromide ion. Sodium bromide has not generally been viewed as a potential feed stock for chemical processes. Now, instead of being thrown out, sodium bromide brine may be treated in accordance with this invention so that materials which in the past have been considered waste products may now be reclaimed and put to valuable uses.

Previous separation techniques have relied on oxidation of the bromide ion to bromine and separation from solution as a gas. Other methods of bromide concentration have been based on solvent extraction or ion exchange. The present invention relates to the recovery of the bromide ion as calcium bromide or ammonium bromide which are commercially useful.

SUMMARY OF THE INVENTION

The present invention is directed broadly to a method of converting sodium bromide to ammonium bromide and preferably to calcium bromide. In a specific embodiment of the invention, the method includes converting an aqueous solution containing sodium bromide to a solution containing ammonium bromide and sodium bicarbonate. Preferably, ammonia and carbon dioxide or their reaction product are introduced to a solution of sodium bromide brine brine. After reaction, ammonium bromide may be recovered from the solution, preferably by crystallization.

In another specific embodiment, the method includes the steps of introducing ammonia and carbon dioxide into a solution of sodium bromide brine brine; mixing the ingredients for a sufficient time to provide a solution that includes dissolved species such as ammonium bromide, ammonium carbonate and ammonium bicarbonate, as well as sodium bicarbonate precipitate; removing from the solution the sodium bicarbonate precipitate; removing excess ammonium carbonate, ammonia and carbon dioxide from the solution by heating; recovering ammonium bromide; and reacting the ammonium bromide solution with a calcium source such as lime to produce calcium bromide.

Methods in accordance with the present invention may be used to transform sodium bromide brine, rejected by many as waste products, into ammonium bromide or calcium bromide. Thus, in one aspect, the invention is directed to a method of reclaiming sodium bromide brine. The ammonium ion in the ammonium bromide product is much easier than sodium to move into and out of aqueous solutions, making it a much more useful and valuable material. The product brine may either be used directly or in more concentrated form. If desired, the ammonium bromide may also be recovered as a solid. "Recovering" ammonium bromide in this patent refers to all these possibilities, in the sense that the reaction product is recovered in the desired form.

DETAILED DESCRIPTION AND SPECIFIC EMBODIMENTS

While the process covers a variety of modifications, a specific embodiment of the invention is directed to a method including the step of introducing ammonia and carbon dioxide into a solution of sodium bromide brine and mixing the ingredients to provide a solution that includes dissolved species such as ammonium bromide, ammonium carbonate and ammonium bicarbonate, as well as solid precipitates such as sodium bicarbonate. As an alternative to introducing ammonia and carbon dioxide separately into the brine solution, the reaction product of ammonia and carbon dioxide may be introduced into the brine solution, although it is generally more economical to introduce them separately in unreacted form.

The method preferably further includes the steps of separating or removing from the solution the sodium bicarbonate precipitate solids; removing excess ammonium carbonate from the solution by heating; and recovering ammonium bromide from the solution. In a preferred aspect, the invention also includes stripping excess ammonia and carbon dioxide from the solution; recycling sodium bromide for addition with the feed stream; and reacting the ammonium bromide solution with lime (calcium oxide) or hydrated lime (calcium hydroxide) to drive off the ammonia, substitute the calcium ion for the ammonium ion in the solution, and produce calcium bromide. The ammonia may then be recycled for further use in the process. The solution, a mixture of calcium bromide and sodium bromide, may then be concentrated by evaporation to provide for saturation with respect to sodium bromide and precipitation of sodium bromide from the solution. The sodium bromide solids may then be separated from the brine and recycled for further use, preferably with the feed stream in the front end of the process.

In a preferred embodiment of this invention, an important step in producing calcium bromide and ammonium brine involves concentrating by evaporation the ammonium or calcium bromide brines which result from the reaction after removal of sodium bicarbonate and subsequent removal of excess ammonia. The initial removal of sodium in the bicarbonate form has generally been found to be about 60% to 80% effective.

Figure 1:
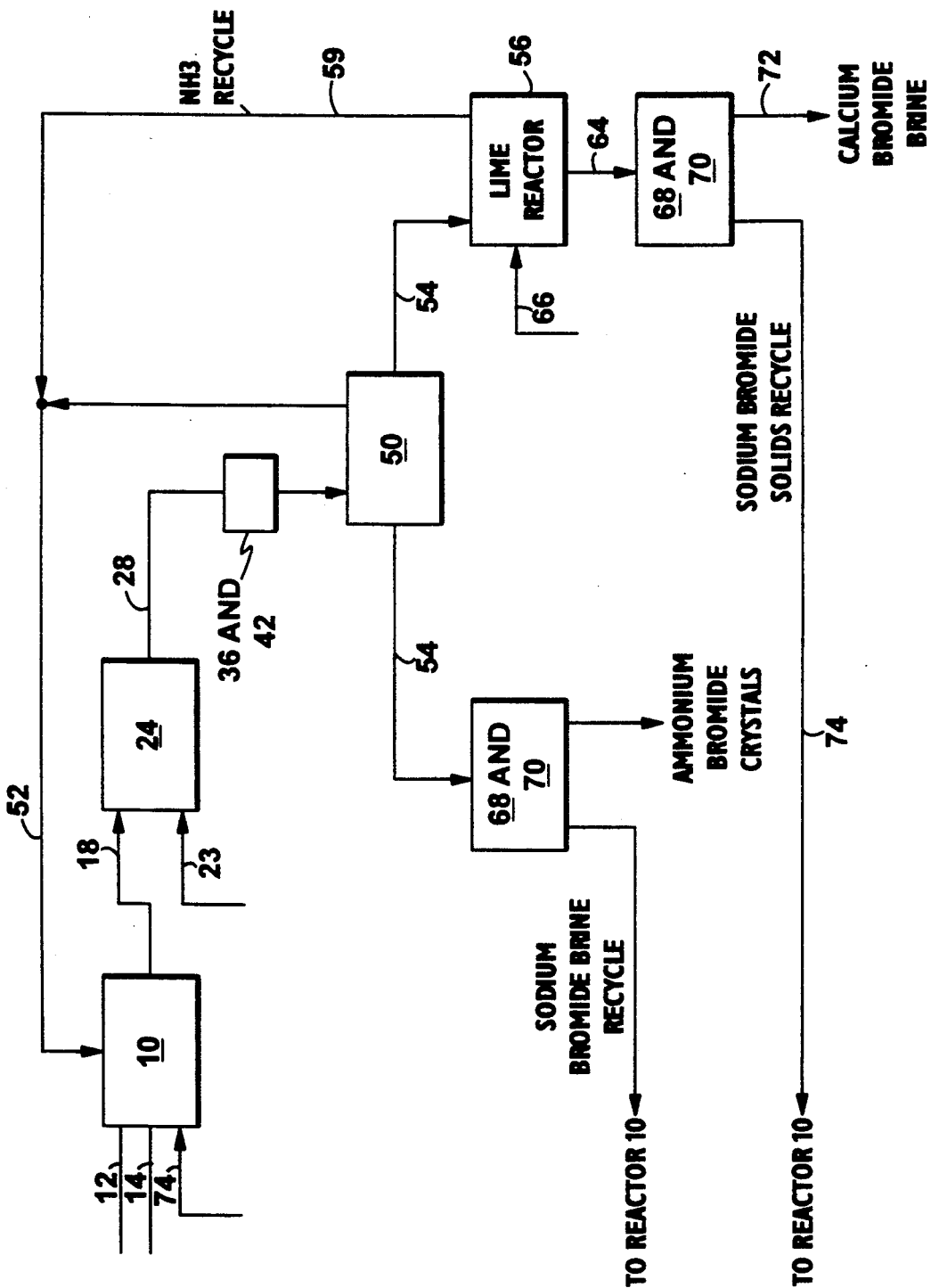
FIG. 1 is a schematic diagram of various steps in specific embodiments of the invention.

FIG. 1 is a schematic flow diagram for making ammonium bromide and/or calcium bromide. The reference numbers in FIG. 1 correspond to those in FIG. 2 and are explained in greater detail below in reference to equipment that may be used to carry out the various steps. As reflected in FIG. 1, there are differences in both the process and the ingredients, depending whether the desired end product is ammonium bromide or calcium bromide. If ammonium bromide is the desired end product then the intermediate brine may be evaporated until saturation is reached with respect to ammonium bromide, at which time it will begin to precipitate. On the other hand, if calcium bromide is the desired end product, then the intermediate brine should be treated with a calcium source such as lime to drive off the ammonia and then evaporated until saturation is reached with respect to sodium bromide. The sodium bromide crystals may then be recycled to the front end of the process as described.

Further evaporation of the intermediate bromide brine, still containing appreciable sodium, has the effect of driving the chemical equilibrium to the point where sodium bromide begins to selectively crystallize out from solution, thus removing the dissolved sodium. In such a case, the sodium bromide crystals may be recycled to the front end of the process for reprocessing.

Figure 2:
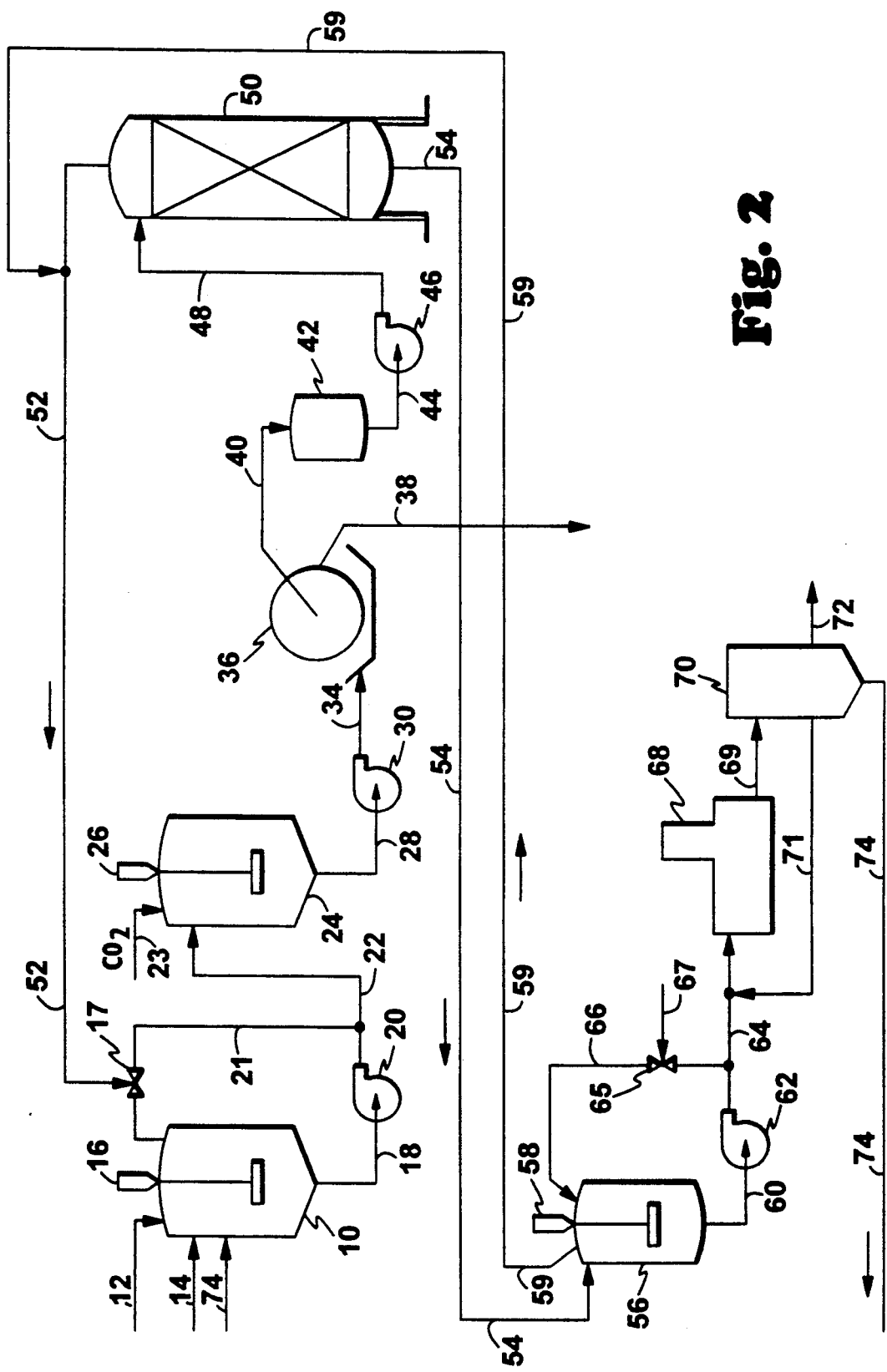
FIG. 2 is a process flow diagram in accordance with a preferred embodiment of the present invention.

FIG. 2 is a flow diagram of a process for making ammonium bromide and calcium bromide in accordance with the invention.

The original ammonia and sodium bromide reagents are preferably added through lines 12 and 14, respectively, to mixing reactor 10. The ammonia ($NH_3$) may be added in either a stoichiometric amount or up to a 10% excess, sufficient to react with the sodium bromide (NaBr), which may take the form of a thirty to forty percent aqueous solution by weight. After sufficient stirring in reactor 10 with stirrer 16, the solution is directed through line 18 to pump 20 after which a portion of stream 22 may be recycled back to the mixing reactor 10 through line 21. The amount in recycle line 21 may be controlled by an eductor 17. The eductor is a device that creates a vacuum when liquid is passed through it. It is shown here as a means of pulling the ammonia liberated further in the process back to the front end thus recycling the ammonia. The flow directed through the eductor is done so only to create this vacuum. As such the eductor does not control the flow. Fluid should only be put through the eductor when the need for a vacuum is present. The non-recycled portion of the solution is directed through line 22 to mixing reactor 24, which includes stirrer 26.

In a specific embodiment of the invention, carbon dioxide (preferably in gaseous form) may be introduced to reactor 24 through line 23 in stoichiometric amounts sufficient to react with the ammonia and form ammonium carbonate in mixing vessel 24. In another embodiment, carbon dioxide may be added together with ammonia in the first reactor 10. In still another embodiment, the reaction product of carbon dioxide and ammonia, in the form of solid ammonium bicarbonate, may be added. In the first specific embodiment mentioned, the carbon dioxide gas reacts with the first solution from reactor 10 to provide a second solution comprising unreacted ammonia, water, carbon dioxide, ammonium bicarbonate, sodium bicarbonate and ammonium bromide. This solution is directed through line 28, pump 30, and line 34 to solid/liquid separating device 36, which is preferably a rotating drum vacuum filter. In the solid/liquid separator 36, the sodium bicarbonate may be separated as a solid precipitate and recovered through line 38. After removal of the solid precipitate, the remaining solution, containing sodium bromide, ammonium bromide and ammonium bicarbonate in separator 36, is directed through line 40 to a collecting tank, preferably a vacuum receiver tank 42 from whence it is pumped through line 44, pump 46 and line 48 to separator or stripper 50, where heat and preferably a vacuum is applied. The overhead portion of the stripper 50, which includes ammonia and/or carbon dioxide, may be recycled back to mixing reactor 10 through line 52. In FIG. 1, the separator 36 and vacuum receiver tank 42 are represented as a single process step.

The bottoms component from stripper 50, a solution comprising ammonium bromide and sodium bromide, is preferably directed through line 54 to calcium treatment vessel 56, which includes stirrer 58. Of the originally present bromide ions approximately 70% should be accounted for as ammonium bromide and approximately 30% as sodium bromide. This bottoms component solution is mixed in vessel 56, and directed through line 60 and pump 62 into line 64. A portion of the ammonium bromide/sodium bromide solution is preferably continuously recycled back through vessel 56 via line 66 after being contacted with a calcium ion source, preferably calcium oxide (hydrated lime). Although other contacting methods may be used, the calcium is preferably added to the ammonium bromide/sodium bromide solution by injecting lime through line 67 to the recycle stream 66 with an eductor 65. Ammonia liberated in the calcium mixing vessel 56 may be removed in gaseous form, preferably by heating, and recycled through line 59 to the recycle stream 52.

The non-recycled portion of the solution in line 64 is directed to a device for recovering or precipitating sodium bromide solids and for recovering calcium bromide brine. Preferably, this precipitation device comprises evaporator 68, which removes water from the solution, and crystallizer 70, which chills the solution sufficiently to provide for a sodium bromide precipitate. Evaporator 68 and crystallizer 70 may constitute a single unit or separate units. The solid sodium bromide crystals which are produced in vessel 70 may be recycled back to the front of the process, as shown coming out of the bottom of a cone bottom tank. The clear, solids free fluid exits through either line 72 as finished product or may be recycled back to line 64 through line 71 for further evaporation. A final product comprising calcium bromide may be recovered from the crystallizer 70 through line 72.

Figure 3:
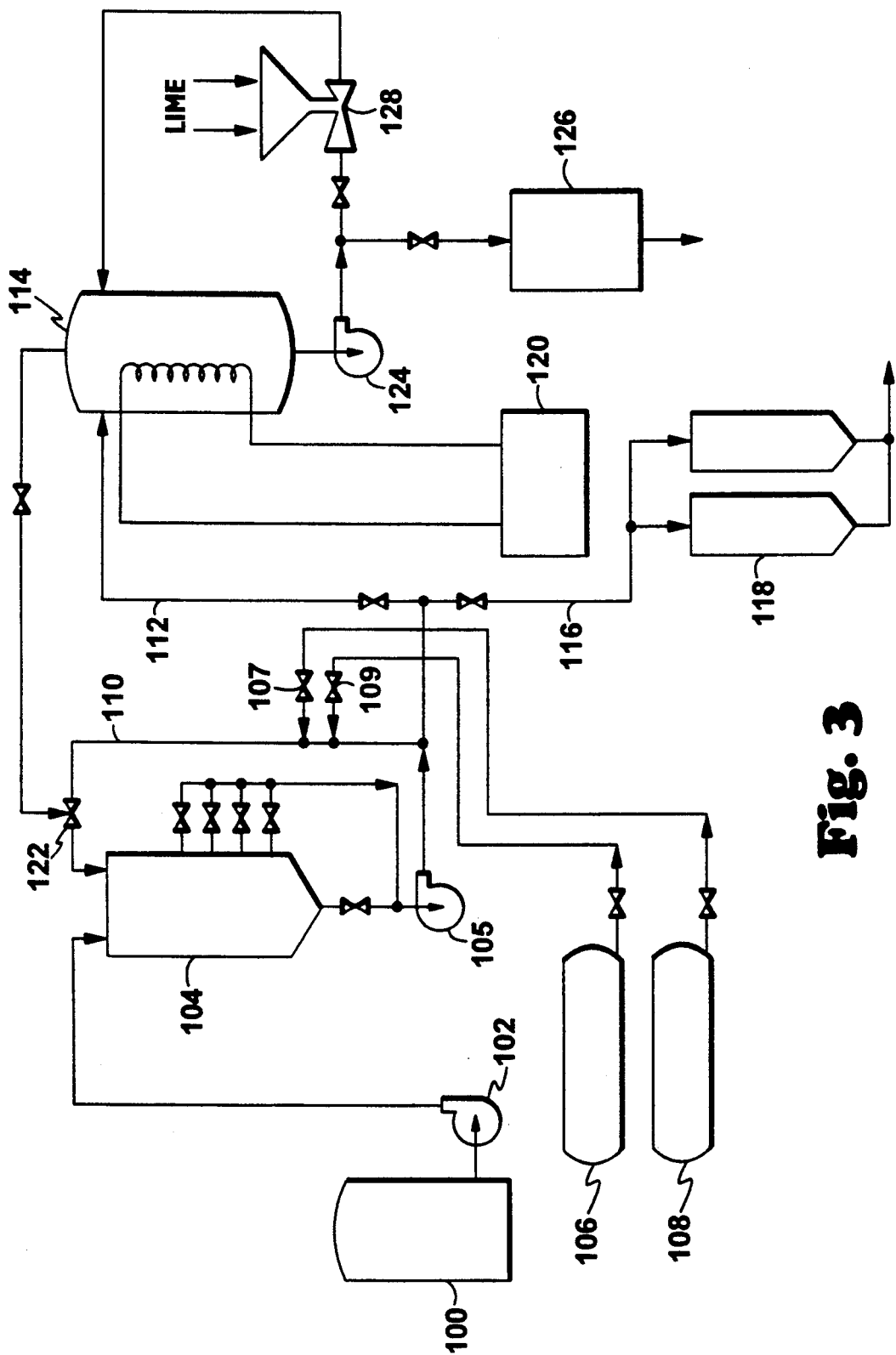
FIG. 3 is an alternative process flow diagram of the invention.

FIG. 3 is a flow diagram showing an alternative batch process for carrying out aspects of the invention. A storage tank 100 is provided for the sodium bromide brine feed stock. A pump 102 transfers the brine to a reaction vessel 104, where the brine is mixed with ammonia and carbon dioxide. The ammonia may be in either anhydrous or aqueous form, although the anhydrous ammonia is usually preferred. This mixing may be done in a stepwise fashion. First ammonia may be added in the correct amount and then carbon dioxide added in proportion to the ammonia. These reactants, preferably in gaseous form, may be supplied from tanks 106 and 108 respectively.

Line 110 as shown in FIG. 3 is a recycle line which may be used to circulate brine while ammonia and carbon dioxide are added. Preferably, the two reactants are not added simultaneously. During the stripping step which is carried out in vessel 114, fresh brine from tank 100 may be charged into vessel 104 and circulated through the eductor to cause a vacuum thus recycling the liberated ammonia from vessel 114 back into the fresh sodium bromide brine in 104. The slightly ammoniated brine may then be brought to the proper ammonia concentration by addition of fresh ammonia from tank 106. The reaction products are withdrawn from stream 110. Controlling devices, preferably valves 107 and 109, may be provided for regulating the amount of carbon dioxide and ammonia from tanks 108 and 106, respectively.

In a batch process, fluid is drawn off the top of tank 104 and solids are directed to the line 112 and vessel 114 via pump 105. After the sodium bicarbonate precipitate has settled from the reaction mixture in 104, the clear brine fluid may be drawn off through the decant lines on the side of 104. The fluid is directed to 114 through line 112. The solid sodium bicarbonate is directed to 118 through line 116. The remainder of the brine proceeds through a line 112 to a vacuum stripper 114. The sodium bicarbonate precipitate is routed through line 116 to purification and storage tanks 118. While not required, an electrical immersion heater 120 may be used to provide heat for the stripper 114. The ammonia and carbon dioxide liberated by the stripping may be recycled to the reaction vessel 104 through an eductor 122, which helps pull a vacuum on the stripper 114.

The ammonium bromide brine withdrawn from the stripper 114 through a drain line 124 may be transferred to an evaporator 126 for concentration. Alternatively, it may be converted to a calcium bromide brine using a method described elsewhere in this patent. If the latter option is chosen, the ammonium bromide brine withdrawn through drain line 124 may be pumped through an eductor 128, in which a calcium source, preferably lime, is added to produce calcium bromide, and then recycled to the stripper 114.

Sodium bromide used as feed stocks in accordance with the invention are typically available in the form of a brine which is nearly saturated, having a density of from about 10.5 to 12.4 pounds per gallon and concentration of from about 28% to 45%. Such brines are available as by-products of industrial chemical processes.

A method of carrying out the batch process in FIG. 3 includes a first step of introducing ammonia and carbon dioxide into the sodium bromide brine, either in gaseous form or as solid ammonium bicarbonate. Preferably an excess of ammonia and carbon dioxide are added, so that ammonium carbonate is left over with the reaction product. If the reagents are introduced in gaseous form, the ammonia should be added first and the carbon dioxide second. Further, it is preferred to maintain the temperature of the solution after ammonia introduction and before carbon dioxide introduction below approximately 60° C., as this should improve carbon dioxide's solubility and facilitate precipitation. The first step can be represented as follows:

$$NaBr + NH_4HCO_3 \text{ (excess)} \rightarrow NaHCO_3 \downarrow + NH_4Br \qquad (1)$$

After all the reactants are combined, the solution is preferably cooled, for example, to approximately 30° C., to encourage precipitation of sodium bicarbonate, which may then be removed. Removal may be accomplished by filtration or by other methods known to those skilled in the art. An excess of ammonium bicarbonate (e.g., from 1.1 to 1.25 moles) is preferably added, which may be removed after the reaction and separation of the sodium bicarbonate, typically by heating under a slight vacuum, then recycled. Although optional, the use of a slight vacuum may provide for liberation of the ammonia and carbon dioxide at a lower temperature.

Still referring to FIG. 3, the next step of the batch process involves removing the excess ammonium bicarbonate by heating the solution. Ammonia and carbon dioxide gas are released because their solubility in aqueous solution is greatly reduced as temperature increases. The amount of heat applied should be selected to substantially completely drive off these gases.

The next step, if the desired end product is ammonium bromide, is to concentrate the brine until the ammonium bromide begins to crystallize out at which point the crystals may be separated from the mixture. After some recycling of the sodium/ammonium bromide brine, the ammonium bromide component becomes depleted and the remaining sodium bromide may be recycled to the front end of the process. Run in this fashion, a high purity ammonium bromide is made and substantially all of the sodium ion is precipitated as sodium bicarbonate.

In the process for making calcium bromide, an approximately 70:30 ammonium bromide:sodium bromide brine remaining after the excess ammonium bicarbonate is removed should be treated with a calcium source such as hydrated lime (calcium hydroxide) and then stripped of the remaining ammonia to produce a 70:30 calcium bromide:sodium bromide brine. Further concentration by evaporation should cause the sodium bromide to precipitate as a crystalline solid which may be separated from the calcium bromide brine, the desired end product.

In the process for producing ammonium bromide, the ammonium bromide should be selectively crystallized out of solution and the sodium bromide brine recycled to the front end of the process, as previously shown in FIG. 1. When the desired product is calcium bromide brine, the sodium bromide should be selectively crystallized out as a solid and recycled to the front of the process and the calcium bromide brine taken off as the desired end product.

To illustrate the stoichiometric amounts of the materials that can be reacted using this method, 83.3 gallons of 40% sodium bromide brine, having a density of approximately 11.8 pounds per gallon, and containing 400 pounds or 3.89 moles of sodium bromide, may be contacted with approximately 73 pounds (4.28 moles including a 10% excess) of ammonia and 188 pounds (4.28 moles including a 10% excess) of carbon dioxide. The product solution should contain about 228 pounds of solid sodium bicarbonate and 265 pounds of ammonium bromide. After the bicarbonate precipitate is removed and any excess ammonia and carbon dioxide are driven off, the brine should contain approximately 27% ammonium bromide and 12% sodium bromide by weight, and a density of 10.8 pounds per gallon. In another aspect of the invention, which is discussed elsewhere in this patent, this ammonium bromide brine may be reacted with lime to provide calcium bromide.

Clearly, this invention is not limited or restricted to the examples and embodiments described in this patent. It is clear that modifications and variations can be made to this invention by those skilled in the art without departing from the scope or spirit of the invention. This invention is intended to broadly cover any such modification or variation, provided it comes within the scope of any one of the following claims or their equivalents.

We claim:

1. A method of making ammonium bromide, comprising the steps of:
    (a) introducing ammonia and carbon dioxide or a reaction product of ammonia and carbon dioxide into a reactant solution comprising sodium bromide brine; producing a resulting product solution thereof and
    (b) recovering solid ammonium bromide from the resulting product solution by evaporative crystallization.

2. The method of claim 1, wherein said ammonia and carbon dioxide are in gaseous form and are introduced in excess of stoichiometric amounts necessary to react with the sodium bromide to produce sodium bicarbonate and ammonium bromide.

3. The method of claim 1, wherein ammonia is introduced into the solution before carbon dioxide is introduced.

4. The method of claim 3, wherein the solution temperature after ammonia is introduced and before carbon dioxide is introduced is maintained below about 60° C.

5. A method of making ammonium bromide, comprising the steps of:
    (a) introducing ammonia and carbon dioxide or a reaction product of ammonia and carbon dioxide into a reactant solution comprising sodium bromide brine to provide a product solution comprising ammonium bromide, ammonium bicarbonate, and a sodium bicarbonate precipitate;
    (b) removing from the product solution the sodium bicarbonate precipitate; and
    (c) recovering solid ammonium bromide from the product solution by evaporative crystallization.

6. The method of claim 5, additionally comprising the step of removing excess ammonium bicarbonate from the product solution by heating prior to the recovery of ammonium bromide of step (c).

7. The method of claim 5, in which ammonia and carbon dioxide are in gaseous form and are introduced in excess of stoichiometric amounts necessary to react with the sodium bromide to produce sodium bicarbonate and ammonium bromide.

8. The method of claim 5, in which the ammonia is introduced into the solution before carbon dioxide is introduced.

9. The method of claim 5, in which the reactant solution temperature after ammonia is introduced and before carbon dioxide is introduced is maintained below about 60° C.

10. The method of claim 5, in which the product solution is cooled after step (a) and during step (b).

11. A method of making ammonium bromide, comprising the steps of:
    (a) introducing ammonia into a reactant solution comprising sodium bromide brine;
    (b) maintaining the reactant solution at a temperature below about 60° C.
    (c) introducing carbon dioxide into the reactant solution to provide a product solution comprising ammonium bromide, ammonium bicarbonate, and a sodium bicarbonate precipitate;
    (d) cooling the product solution;
    (e) removing from the product solution the sodium bicarbonate precipitate;
    (g) recovering solid ammonium bromide from the product solution by evaporative crystallization.

12. The method of claim 11, in which ammonia and carbon dioxide are introduced in excess of stoichiometric amounts necessary to react with the sodium bromide to produce sodium bicarbonate and ammonium bromide.

13. A method of making calcium bromide comprising the steps of:
    (a) introducing ammonia and carbon dioxide or a reaction product of ammonia and carbon dioxide into a reactant solution comprising sodium bromide to provide a product solution comprising ammonium bromide and sodium bromide;
    (b) contacting the product solution with calcium hydroxide or calcium oxide to provide a final solution comprising calcium bromide, sodium bromide, and water;
    (c) evaporating at least a portion of the water to increase concentrations of sodium bromide and calcium bromide in the final solution;
    (d) cooling the concentrated final solution sufficiently to precipitate the sodium bromide out of the solution; and
    (e) recovering calcium bromide from a remainder of the final solution.

14. The method of claim 13, wherein ammonia and carbon dioxide are in gaseous form and are introduced in excess of stoichiometric amounts necessary to react with the sodium bromide to produce sodium bicarbonate and ammonium bromide.

15. The method of claim 13, wherein ammonia is introduced into the reactant solution before carbon dioxide is introduced.

16. The method of claim 15, wherein the reactant solution temperature after ammonia is introduced and before carbon dioxide is introduced is maintained below about 60° C.

17. A method of making calcium bromide comprising the steps of:
    (a) introducing ammonia and carbon dioxide or a reaction product of ammonia and carbon dioxide into a reactant solution comprising sodium bromide brine to provide a product solution comprising ammonium bromide, sodium bromide, ammonium bicarbonate and a sodium bicarbonate precipitate;
    (b) removing from the product solution the sodium bicarbonate precipitate;
    (c) contact the product solution with calcium hydroxide or calcium oxide to provide a final solution comprising calcium bromide, sodium bromide, and water;
(d) evaporating at least a portion of the water to increase concentrations of sodium bromide and calcium bromide in the final solution;
(e) cooling the concentrated final solution sufficiently to precipitate the sodium bromide out of the solution; and
(f) recovering calcium bromide from a remainder of the final solution.

18. The method of claim 17, wherein ammonia and carbon dioxide are in gaseous form and are introduced in excess of stoichiometric amounts necessary to react with the sodium bromide to produce sodium bicarbonate and ammonium bromide.

19. The method of claim 17, wherein the product solution is cooled before step (b) to help precipitate sodium bicarbonate.

20. The method of claim 17, wherein ammonia is introduced into the reactant solution before carbon dioxide is introduced.

21. The method of claim 20, wherein the reactant solution temperature after ammonia is introduced and before carbon dioxide is introduced is maintained below about 60° C.

22. A method of making calcium bromide comprising the steps of:
(a) introducing ammonia into a reactant solution comprising sodium bromide brine;
(b) maintaining the reactant solution at a temperature below about 60° C.;
(c) introducing carbon dioxide into the reactant solution to provide a product solution comprising ammonium bromide, sodium bromide, ammonium bicarbonate and a sodium bicarbonate precipitate;
(d) cooling the product solution to help precipitate sodium bicarbonate;
(e) removing from the product solution the sodium bicarbonate precipitate;
(f) removing excess ammonium bicarbonate from the product solution by heating;
(g) contacting the product solution with calcium hydroxide or calcium oxide to produce a final solution comprising calcium bromide, sodium bromide, and water;
(h) evaporating at least a portion of the water to increase concentrations of sodium bromide and calcium bromide in the final solution;
(i) cooling the concentrated final solution sufficiently to precipitate the sodium bromide out of the solution; and
(j) recovering calcium bromide from a remainder of the final solution.

23. The method of claim 22, wherein ammonia and carbon dioxide are in gaseous form and introduced in excess of stoichiometric amounts necessary to react with the sodium bromide to produce sodium bicarbonate and ammonium bromide.

* * * * *

UNITED STATES PATENT AND TRADEMARK OFFICE
CERTIFICATE OF CORRECTION

PATENT NO. : 5,290,531
DATED : March 1, 1994
INVENTOR(S) : Russell A. Fisher; Surendra K. Mishra, both of the Woodlands; Rosa T. Swartwout, Houston, all of Tex.

It is certified that error appears in the above-indentified patent and that said Letters Patent is hereby corrected as shown below:

Column 8, line 67, "contact" should be --contacting--.

Signed and Sealed this

Nineteenth Day of July, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,290,531
DATED : March 1, 1994
INVENTOR(S) : Russell A. Fisher; Surendra K. Mishra, both of the Woodlands; Rosa T. Swartwout, Houston, all of Texas It is certified that error appears in the above-indentified patent and that said Letters Patent is hereby corrected as shown below:

Column 8, line 18, insert:
--(f) removing excess ammonium bicarbonate from the product solution by heating; and--

Signed and Sealed this

Thirteenth Day of June, 1995

Attest:

BRUCE LEHMAN

Attesting Officer

Commissioner of Patents and Trademarks